(12) United States Patent
Williams

(10) Patent No.: US 7,762,000 B2
(45) Date of Patent: Jul. 27, 2010

(54) ANIMAL CLIPPING AND SHEARING APPARATUS

(75) Inventor: John Alun Harris Williams, Wotton-Under-Edge (GB)

(73) Assignee: Lister Shearing Equipment Limited, Gloucestershire (GB)

( * ) Notice: Subject to any disclaimer, the term of this patent is extended or adjusted under 35 U.S.C. 154(b) by 0 days.

(21) Appl. No.: 11/913,252

(22) PCT Filed: May 15, 2006

(86) PCT No.: PCT/GB2006/001759

§ 371 (c)(1),
(2), (4) Date: Jun. 23, 2008

(87) PCT Pub. No.: WO2006/123112

PCT Pub. Date: Nov. 23, 2006

(65) Prior Publication Data

US 2008/0289184 A1 Nov. 27, 2008

(30) Foreign Application Priority Data

May 16, 2005 (GB) .................................. 0509945.2

(51) Int. Cl.
*B26B 19/24* (2006.01)
(52) U.S. Cl. .............................. 30/210; 30/122; 30/223
(58) Field of Classification Search .................. 30/210, 30/216, 233, 122, 223
See application file for complete search history.

(56) References Cited

U.S. PATENT DOCUMENTS

| | | | | |
|---|---|---|---|---|
| 1,375,966 A | * | 4/1921 | Jones et al. ..................... | 30/197 |
| 1,446,211 A | * | 2/1923 | Reid ............................. | 30/210 |
| 1,764,614 A | * | 6/1930 | Dremel ......................... | 30/221 |
| 1,877,749 A | * | 9/1932 | Andis ........................... | 30/201 |
| 1,956,042 A | * | 4/1934 | Oster ........................... | 30/221 |
| 2,168,642 A | * | 8/1939 | Andis ........................... | 30/221 |
| 2,268,035 A | * | 12/1941 | Jepson ......................... | 30/221 |
| 2,306,039 A | * | 12/1942 | Cromonic ..................... | 30/201 |
| 2,484,610 A | * | 10/1949 | Cromonic ..................... | 30/210 |
| 2,874,463 A | * | 2/1959 | Andis ........................... | 30/200 |
| 3,259,770 A | | 7/1966 | Mattson et al. | |
| 3,279,062 A | * | 10/1966 | Andis ........................... | 30/210 |
| 3,959,878 A | * | 6/1976 | Irelan et al. ................... | 30/220 |
| 3,988,828 A | * | 11/1976 | Geary .......................... | 30/210 |
| 4,694,575 A | * | 9/1987 | Boerger ....................... | 30/221 |
| 5,386,634 A | * | 2/1995 | Ogle et al. .................... | 30/208 |
| 6,393,702 B1 | * | 5/2002 | Laube .......................... | 30/223 |
| 7,010,859 B2 | * | 3/2006 | Laube .......................... | 30/223 |
| 7,340,839 B2 | * | 3/2008 | Oh ............................... | 30/210 |
| 2003/0005585 A1 | | 1/2003 | Rizzuto, Jr. et al. | |

FOREIGN PATENT DOCUMENTS

| GB | 2312392 | 10/1997 |
|---|---|---|
| WO | 2005049288 | 6/2005 |

* cited by examiner

*Primary Examiner*—Hwei-Siu C Payer
(74) *Attorney, Agent, or Firm*—Downs Rachlin Martin PLLC

(57) ABSTRACT

According to the present invention there is provided head unit (10) for an animal shearing and clipping apparatus, the head unit (10) being configured to receive either a clipping comb and cutter arrangement (12, 14) or a shearing upper and lower blade arrangement (16, 18), the head unit (10) comprising a body (20) having a drive member (22, 24) arranged to drive a movable blade or cutter (14, 18), a mount (28) arranged to receive a complementary mounting feature of a comb or fixed blade (12, 16), a shearing blade guide and a clipping cutter guide.

11 Claims, 8 Drawing Sheets

ANIMAL CLIPPING AND SHEARING APPARATUS

The present invention relates to animal clipping and shearing apparatus and in particular, though not exclusively, to apparatus intended to clip and shear the coats of animals for show and display purposes.

Clipping and shearing apparatuses are used to trim and remove the coats of farm animals such as, for example, sheep and cattle. Both forms of apparatus include a toothed comb and a toothed blade which overlies and bears against the comb. The comb is fixed to the body of the apparatus while the blade is reciprocated over the comb. Animal hair caught between the respective teeth of the comb and blade is cut by the movement of the blade.

In a clipping apparatus the blade or cutter is arranged to move in a straight line over the comb. Typically the cutter is arranged to move along a path which is substantially transverse to the direction of the teeth of both the comb and cutter. In a shearing apparatus the movable blade, commonly referred to as the upper blade, is arranged to move along an arctuate path over the comb or lower blade. In light of the differing blade movement paths, each apparatus is typically required to have a different blade mounting and drive arrangement.

According to a first aspect of the present invention there is provided a head unit for a shearing and clipping apparatus, the head unit being configured to receive either a clipping comb and cutter arrangement or a shearing upper and lower blade arrangement, the head unit comprising a body having a drive member arranged to drive a movable blade or cutter, a mount arranged to receive a complementary mounting feature of a comb or fixed blade, a shearing blade guide and a clipping cutter guide.

The clipping cutter guide may comprise a substantially linear formation of the body arranged to complement a corresponding linear formation of a clipping cutter. The clipping cutter guide preferably comprises a recess or channel of the body into which a complementarily shaped projection of the clipping cutter is receivable. The channel may comprise separate channel portions provided on opposing sides of the body.

The shear blade guide may comprise a mount for a motion linkage of the shearing blade. The mount may comprise one or more projections of the body, which projections are arranged to be received in complementarily shaped recess of the motion linkage. The projections may be defined by inserts of the body.

According to a second aspect of the present invention there is provided a blade for a shearing apparatus, the blade comprising a substantially planar member having a plurality of teeth or tines along a forward edge thereof, a drive interface into which a drive member of a shearing apparatus is receivable, in use, and a motion linkage connectable between the blade and a shearing apparatus to guide the motion of the blade, in use.

In a preferred embodiment the motion linkage is pivotably connectable between the blade and shearing apparatus. The motion linkage may comprise an arm or link pivotably connected to the blade. In a preferred embodiment the motion linkage comprises a pair of spaced links pivotably connected to the blade. Each link is provided with a connection arrangement at the end distal to the blade to enable the link to be connected to the shearing apparatus. The connection arrangement may comprise a projection of one of the shearing apparatus and link and a recess of the other of the shearing apparatus and link.

In an alternative embodiment the motion linkage may be defined by a flexible connection extendable between the blade and shearing apparatus. The linkage may comprise one or more flexible arms or links extending from the blade. Each link is provided with a connection arrangement at the end distal to the blade to enable the link to be connected to the shearing apparatus. The connection arrangement may comprise a projection of one of the shearing apparatus and link and a recess of the other of the shearing apparatus and link.

According to a third aspect of the present invention there is provided a comb for a clipping or shearing apparatus, the comb comprising a substantially planar member having a plurality of tines or teeth along a forward edge thereof, the comb including a mounting aperture which, in use, receive a mounting projection of a body to which the comb is intended to be fitted, the mounting aperture being configured to receive the projection at one of plurality of locations therein and thereby permit the position of the comb on the body to be set by a user. The mounting aperture may be defined by a plurality of overlapping apertures each of which mirrors the cross-sectional shape of the mounting projection. The mounting aperture may be provided in an insert which is fittable to a location on or in the planar member of the blade.

The comb may preferably be provided with more than one mounting aperture. In such an embodiment the body to which the comb is intended to be mounted may be provided with more than one projection.

The head unit of the first aspect may be combined with the blade and/or comb described with reference to the second and third aspects.

An embodiment of the present invention will now be described with reference to the accompanying drawings in which.

Figure 1:
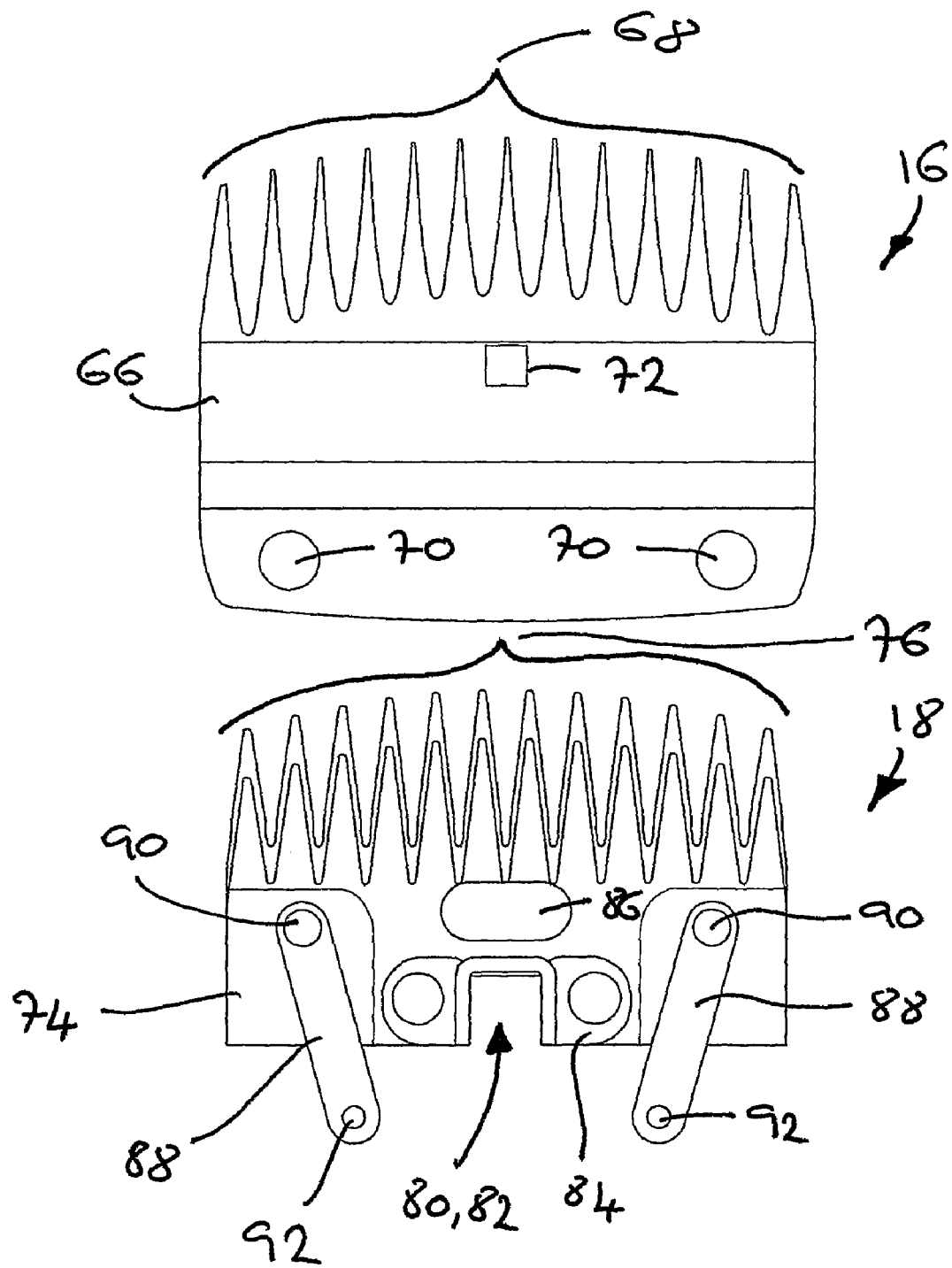
FIG. 1 shows a plan view of a shear blade and shear comb.
Figure 2:
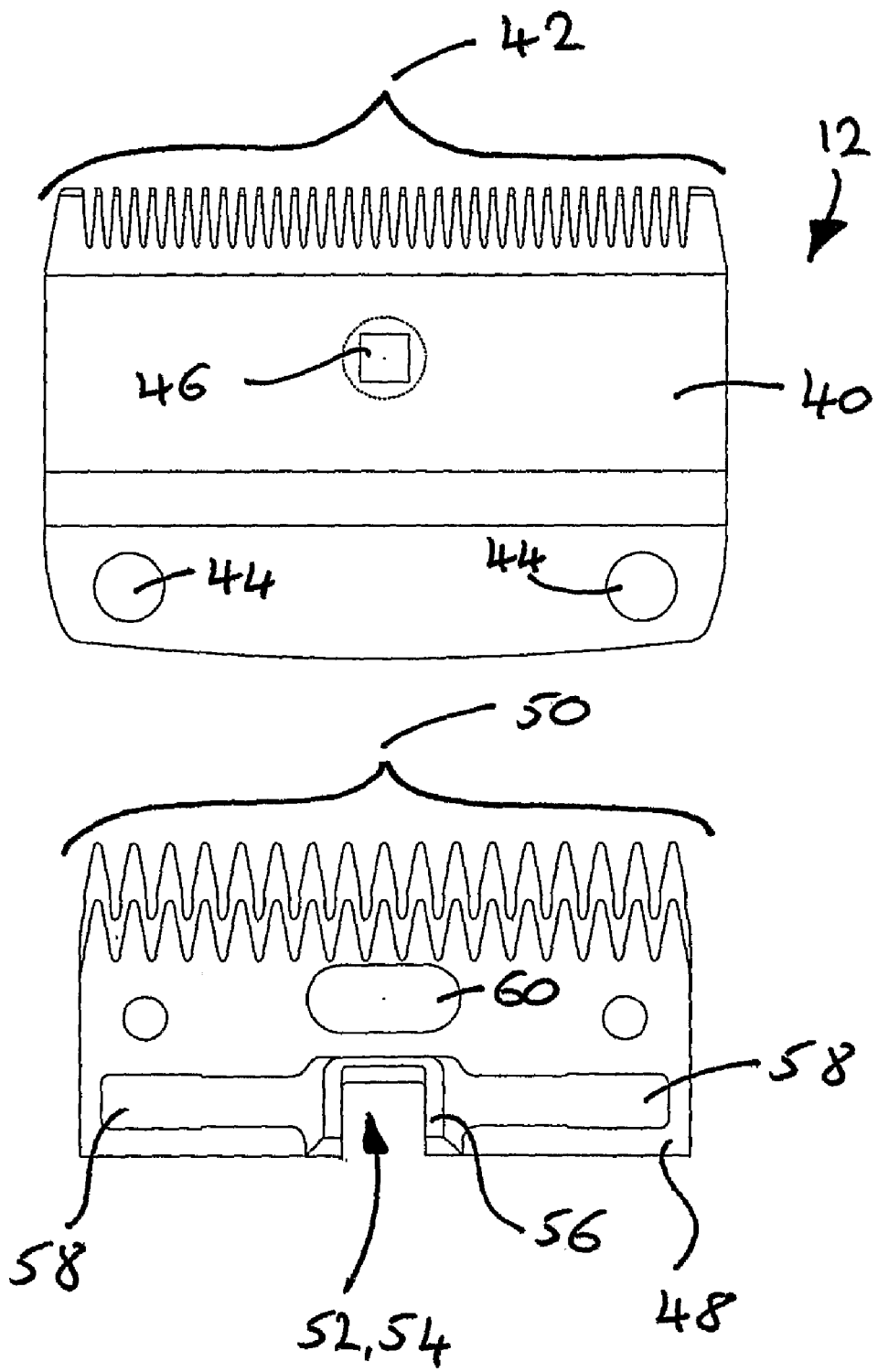
FIG. 2 shows a plan view of a clipper comb and clipper cutter.
Figure 3:
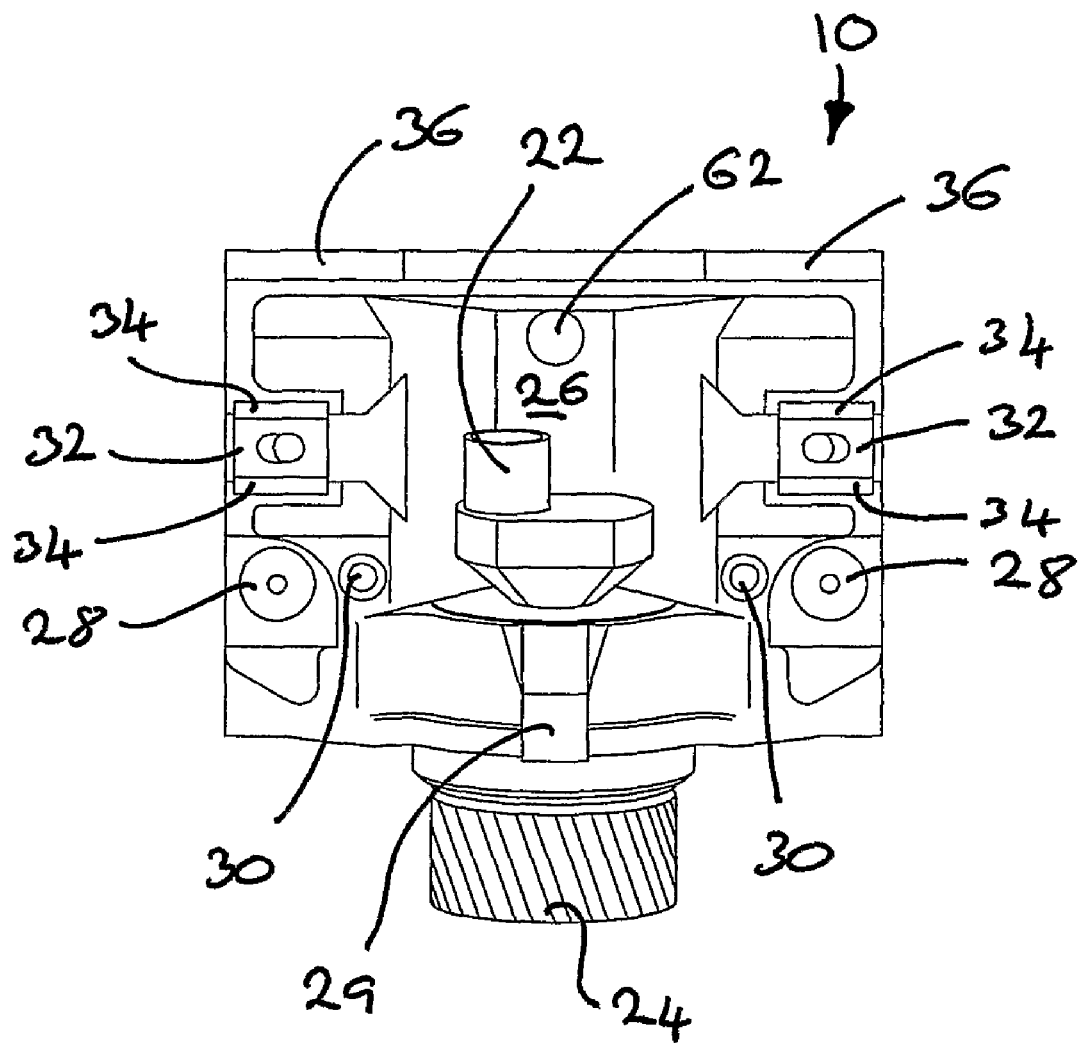
FIG. 3 shows a head unit according to the present invention adapted to receive both the clipper comb and cutter combination and the shear blade arrangement combination.

Referring firstly to FIGS. 1 to 3 there is shown a base or head unit 10, a clipper comb 12, a clipper cutter 14, a shear comb or lower blade 16 and a shear upper blade 18. The base unit 10 comprises a body 20 to which either the clipper comb and cutter 12,14 or the shear blades 16,18 may be mounted. The body 20 includes a drive shaft (not shown) which extend between an eccentrically mounted crank pin 22 and a drive gear 24. The crank pin 22 is positioned in a recess 26 of the body 20, while the drive gear 24 is positioned adjacent an outer face of the body 20. The crank pin 22 comprises an axle which is offset to the drive shaft and a roller mounted to the axle. In use, the body 20 is fittable to a hand unit (not shown) which is configured so as to be gripped by a user. The hand unit includes a motor and driven gear which meshes with the drive gear 24. The drive gear 24 may thus be driven by the motor with the result that the crank pin 22 rotates within the recess 26.

The body 20 is further provided with a pair of comb mounting posts 28, a pair of upper shear blade mounting pins 30 and a pair of aligned clipper cutter guide channels 32. The body 20 may be manufactured from a plastics material by an injection moulding operation. The pins 30 are comprise metal inserts which are incorporated into the body 20 during moulding thereof. The guide channels 32 are at least partially defined by metal wall members 34 which are similarly incorporated into the body 20 during moulding thereof. In an alternative embodiment the guide channels 32 may be fully defined by metal wall members. The body 20 additionally includes a pair of blade or cutter bearing strips 36 along a forward edge thereof. The bearing strips 36 may be made of metal and incorporated into the body 20 during moulding thereof. Alternatively the bearing strips 36 may be defined by the same plastics material as the body 20 In yet an alternative embodiment the body 20 may be manufactured in its entirety from metal, with the features described above as inserts being integrally formed within the body 20. The body 20 is further provided with an engagement projection 29 intermediate the posts 28 against which a portion of the comb 12 or lower blade 16 rests, in use.

The clipper comb 12 is made of metal and comprises a substantially planar member 40 having a plurality of tines or teeth 42 along a forward edge thereof. The teeth 42 are all approximately the same length. The comb 12 includes a pair of spaced mounting apertures 44 which, in use, receive the mounting posts 28 of the body 20 allow the comb 12 to be correctly located on the body 20. The comb 12 is further provided with a tension screw aperture 46.

The clipper cutter 14 is made of metal and comprises a substantially planar member 48 having a plurality of teeth or tines 50 along a forward edge thereof. As with the comb 12 the teeth 50 are all approximately the same length. The cutter 14 is provided with a drive socket 52 into which the crank pin 22 is received, in use. The drive socket 52 is defined by a recess 54 in the rear edge of the cutter 14 and a substantially U-shaped wall 56 which surrounds the recess 54. Lateral guide projections 58 extend along the cutter 14 from opposing sides of the wall 56. The projections 58, in use, are received in the guide channels 32 of the body 20 to guide the motion of the cutter 14 on the body 20. The wall 56 and projections 58 are jointly formed from a plastics material and are defined by a member which is attached to the cutter 14. The cutter 14 is further provided with an aperture 60 which is sized and shaped to receive the tension screw therethrough with sufficient clearance that the tension screw does not impede the movement of the cutter 14, in use.

Figure 4:
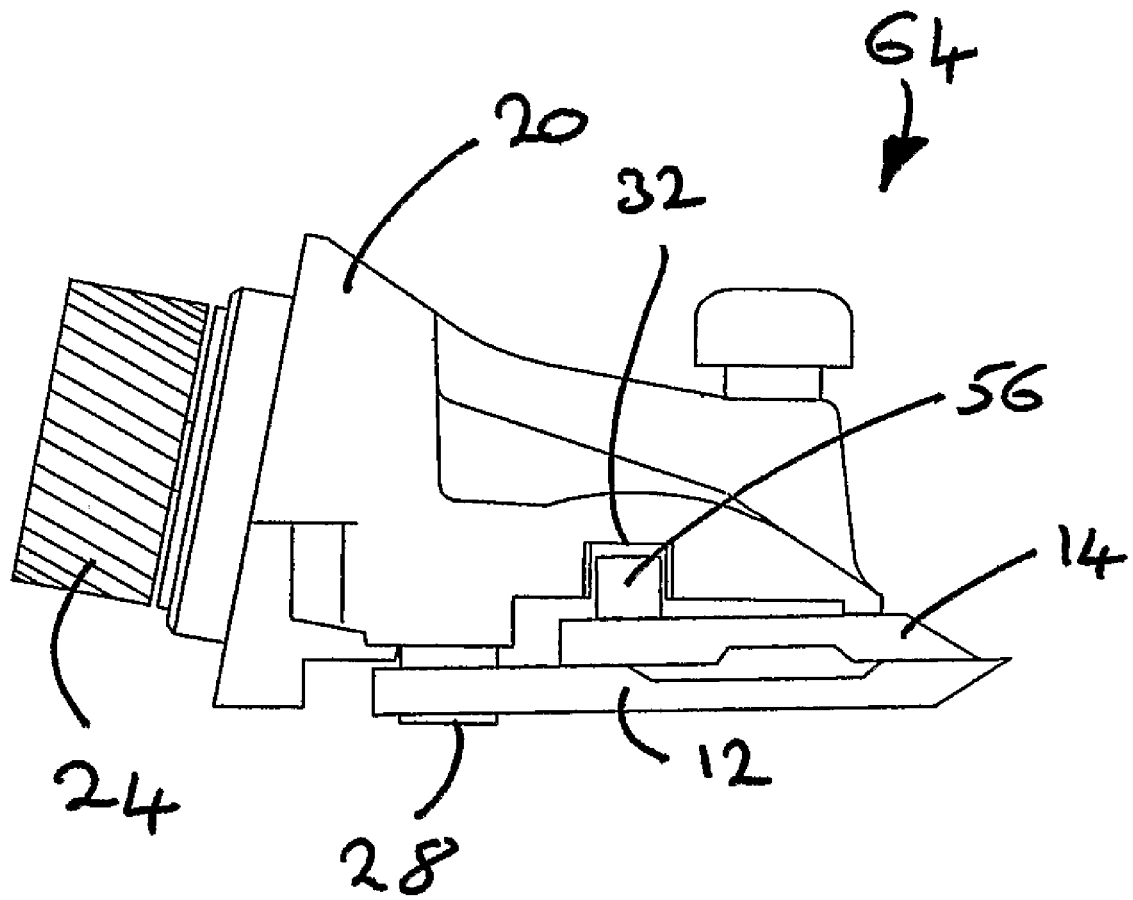
FIG. 4 shows a side view of the clipper comb and cutter fitted to the base unit.

In use, the cutter 14 is fitted to the body 20 such that the crank pin 22 is received in the drive socket 52, and the guide projections 58 are received in the guide channels 32. The comb 12 is then fitted to the posts 28 such that the cutter 14 is sandwiched between the comb 12 and the body 20. A tension screw is then inserted through the comb 12 and the cutter 14 and through an aperture 62 in the body 20. FIG. 4 shows the clipper comb 12, cutter 14 and body 20 in an assembled state together with a tension screw 64. It will be appreciated that as the crank pin 22 is rotated it bears against opposing sides of the wall 56, thereby urging the movement of the cutter 14. The path along which the cutter 14 is constrained to follow is dictated by the receipt of the lateral projections 58 in the guide channels 32. The assembled unit can be fitted to a hand unit and operated in the manner described above.

Referring back to FIG. 1, the shear lower blade 16 is made of metal and comprises a substantially planar member 66 having a plurality of tines or teeth 68 along a forward edge thereof. The lower blade 16 includes a pair of spaced mounting apertures 70 which, in use, receive the mounting posts 28 of the body 20 and allow the lower blade 16 to be correctly located on the body 20. The lower blade 16 is further provided with a tension screw aperture 72.

The shear blade 18 is made of metal and comprises a substantially planar member 74 having a plurality of teeth or tines 76 along a forward edge thereof. The teeth 76 define a curved profile with the teeth in the middle of the blade 18 being longer than the teeth at the respective edges of the blade 18. The blade 18 is provided with a drive socket 78 into which the crank pin 22 is received, in use. The drive socket 78 is defined by a recess 80 in the rear edge of the blade 18 and a substantially U-shaped wall 82 which surrounds the recess 80. The wall 82 is formed from metal and is defined by a member 84 which is attached to the blade 18. The blade 14 is further provided with an aperture 86 which is sized and shaped to receive the tension screw therethrough with sufficient clearance that the tension screw does not impede the movement of the blade 14, in use.

The blade 18 is further provided with a pair of link members 88 which are pivotably connected to the blade 18. The links 88 are pivotably connected to the blade 18 by means of posts 90 which extend though apertures of each link member 88 Each link member 88 is provided with a further aperture 92 at the end of link member 88 remote from its connection point to the blade 18. It will be appreciated that the links 88 thus described are rigid and pivotably connected to the blade 18. In an alternative embodiment the links 88 may be flexible and connected to the blade 18 in a non-pivotable manner.

Figure 6:
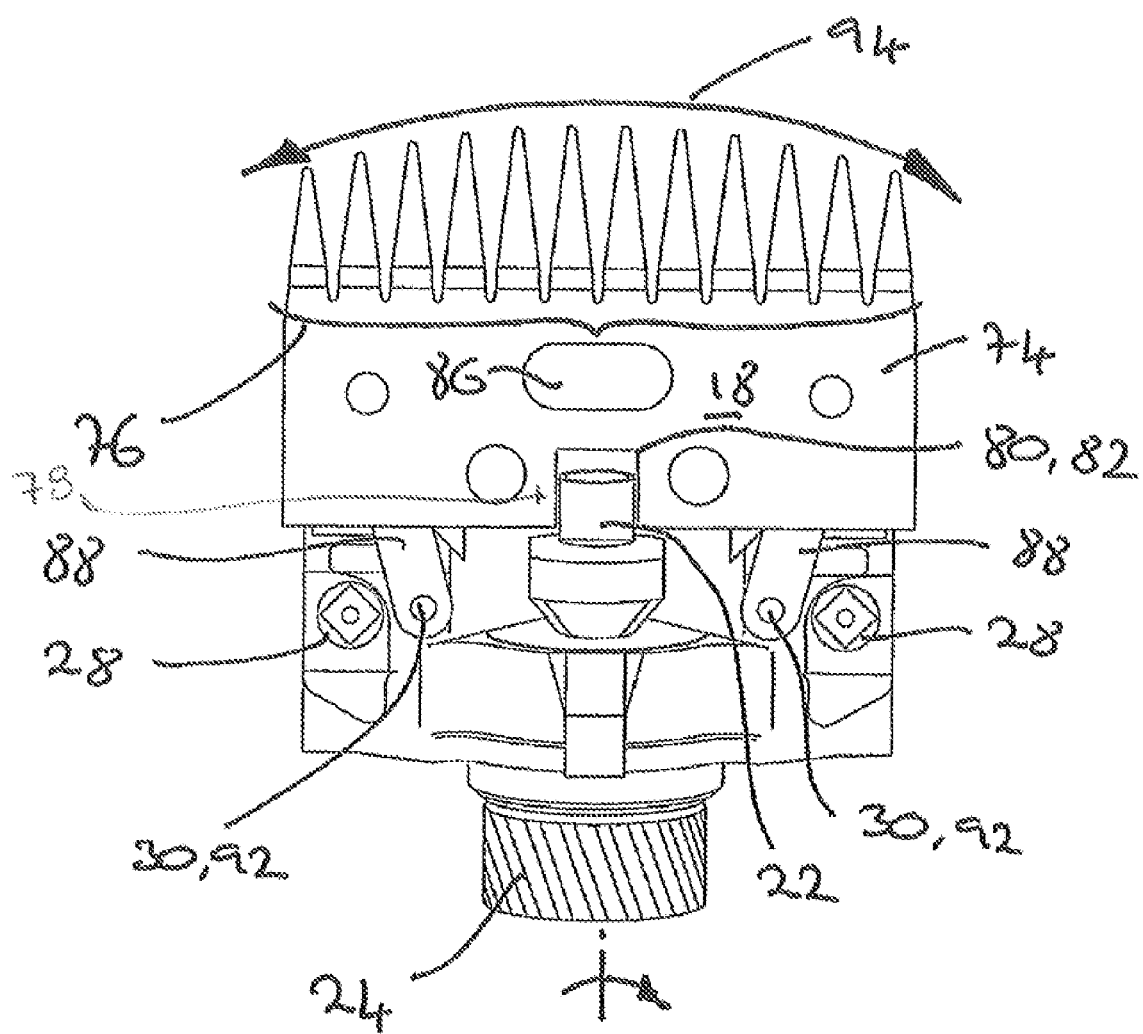
FIG. 6 shows a plan view of the shear blade fitted to the base unit.

In use, the blade 18 is fitted to the body 20 such that the crank pin 22 is received in the drive socket 78, and the shear blade mounting pins 30 of the body 20 are received in the apertures 92 of the link members 88. This fitting of the blade 18 to the body 20 can readily be seen in FIG. 6. The connection of the blade 18 to the body 20 via the pivotable link members 88 enables the blade 18 to reciprocate along a curved path, as indicated by arrow 94 of FIG. 6, when the crank pin 22 bears against opposing sides of the wall 82.

Figure 5:
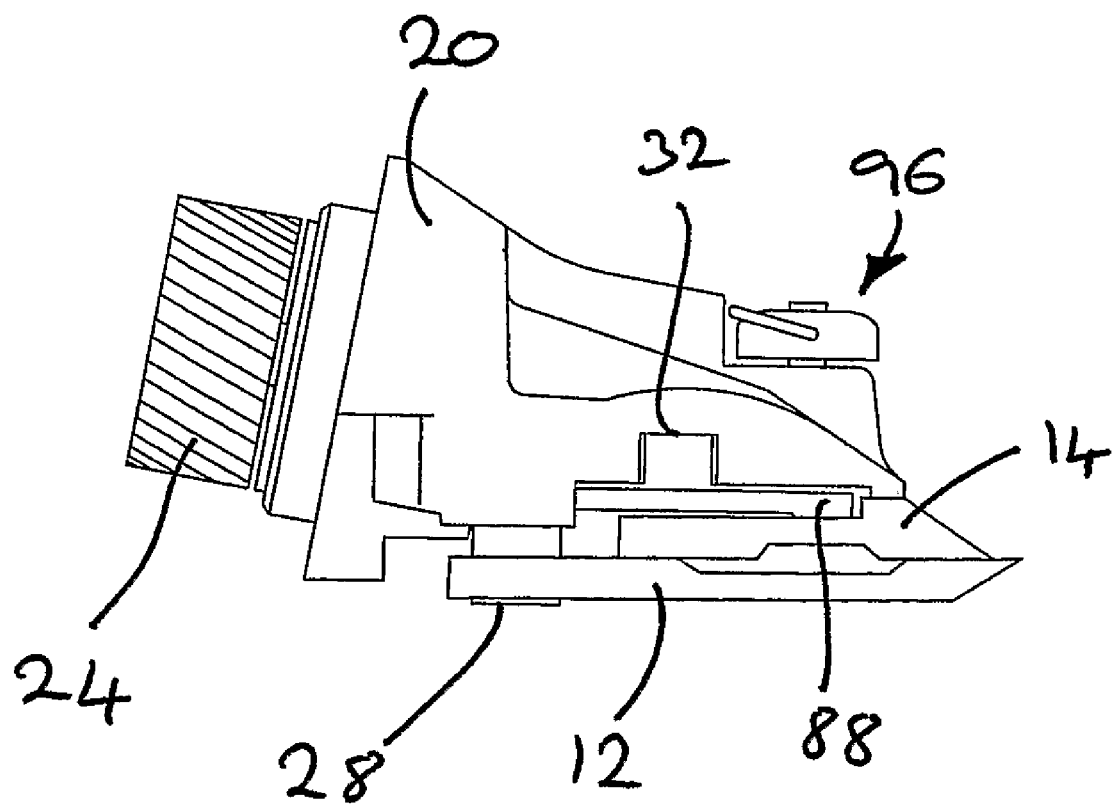
FIG. 5 shows a side view of the shear comb and blade fitted to the base unit.

To complete assembly of the unit the lower blade 16 is then fitted to the posts 28 such that the shear blade 18 is sandwiched between the lower blade 16 and the body 20. A tension screw is then inserted through the lower blade 16 and the shear blade 14 and through an aperture 62 in the body 20. FIG. 5 shows the shear lower blade 16, blade 18 and body 20 in an assembled state together with a tension screw 96. The assembled unit can be fitted to a hand unit and operated in the manner described above.

It will be appreciated that the configuration of the comb/blade 12,16, cutter/blade 14,18 and base unit 10 as described above permits the simple and easy reconfiguration of a hand unit from a clipper to a shear and vice versa. It will also be appreciated that the reconfiguration of the unit does not require any specialist tools.

Figure 7:
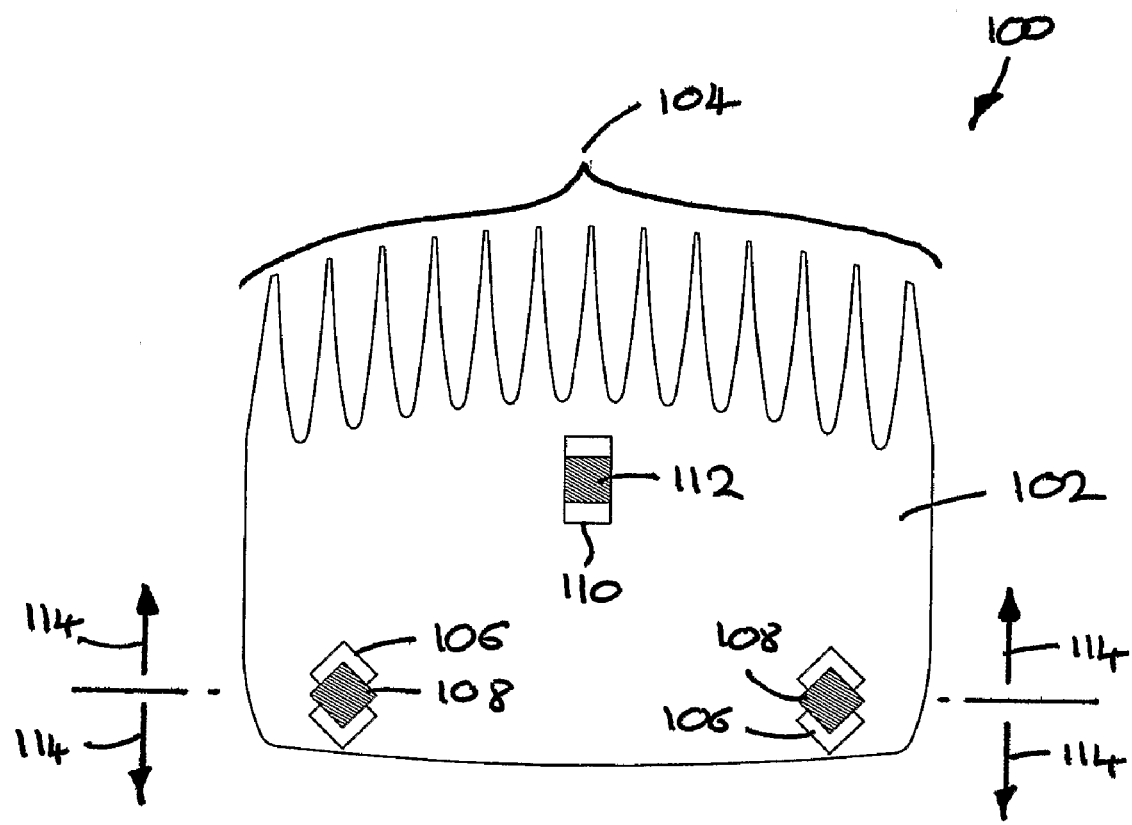
FIG. 7 shows a plan view of a comb according to an aspect of the present invention.

Referring now to FIG. 7 there is shown a shear comb generally designated 100. The comb 100 is made of metal and comprises a substantially planar member 102 having a plurality of tines or teeth 104 along a forward edge thereof. The comb 100 includes a pair of spaced mounting apertures 106 which, in use, receive mounting posts 108 of a body and allow the comb 100 to be correctly located on the body. The comb 100 is further provided with a tension screw aperture 110 through which a tension screw 112 extends, in use.

In the embodiment shown the mounting posts 108 are square in cross-section and the mounting apertures 106 are twelve sided or dodecagonal. The shape of each mounting aperture 106 corresponds to three overlapping squares aligned along an axis extending between diagonally opposed corners of the squares. It will be appreciated that the squares forming the apertures 106 are slightly larger than the square cross-section of the posts 108. The apertures 106 are configured so as to be able to receive the posts 108 in one of three positions on the body as indicated by arrows 114. The distance by which the teeth 104 extend beyond the forward edge of the body can thus be varied by repositioning the comb 100 on the body. It will be understood that this arrangement may also be provided on a clipper comb, and that a comb mounting arrangement of this type may be incorporated into the assemblies described with reference to FIGS. 1 to 6.

In the embodiment shown the apertures 106 are provided directly in the planar member 102 of the comb 100. In an alternative embodiment the apertures 106 may be defined in inserts which are fittable to apertures of the comb 100. The tension screw aperture 110 of the comb 100 is, in the embodiment shown, rectangular. The aperture 110 may alternatively be shaped similarly to the mounting apertures 106 and may be defined by an insert.

Figure 8:
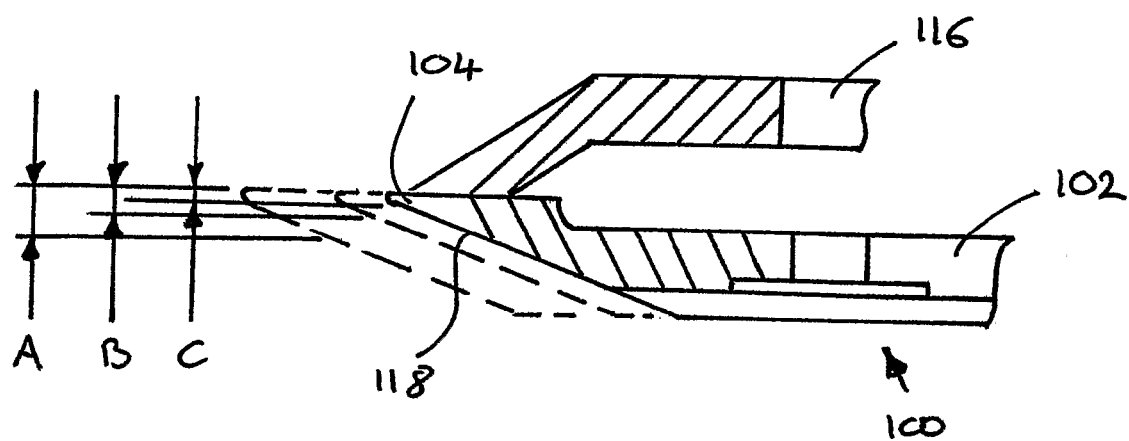
FIG. 8 shows a cross sectional view of the comb of FIG. 7 and a cutter.

FIG. 8 shows a cross-sectional view of the comb 100 of FIG. 7 and a cutter 116. Due to the tapered profile of the teeth 104, movement of the comb 100 in the manner described above results in the variation of the distance between cutter 116 and the outer edge 118 of the comb teeth 104 as indicated by arrows A, B and C.

The invention claimed is:

1. A universal body that accepts a clipping cutter, a comb, a shearing upper blade and a shearing lower blade, body comprising:
   a drive member arranged to drive the clipping cutter or the shearing upper blade;
   plural mounting posts projecting substantially perpendicular to the body, wherein said plural mounting posts are dimensioned and configured to accept the comb and the shearing lower blade;
   plural guide channels recessed into the body, wherein the clipping cutter slidingly engages said plural guide channels, and wherein said plural guide channels cooperate with said drive member to move the clipping cutter along a substantially linear path; and
   plural mounting pins projecting substantially perpendicular to the body, wherein said plural mounting pins cooperate with said drive member to guide the shearing upper blade along a substantially arcuate path.

2. The body according to claim 1, further including an engagement projection interposed between said plural mounting posts and said plural mounting pins.

3. The body according to claim 1, wherein said plural mounting pins are dimensioned and configured to receive a motion linkage of the shearing upper blade.

4. The body according to claim 1, wherein said plural mounting posts and said plural mounting pins are substantially collinear and wherein at least one of each of said plural mounting posts and said plural mounting pins are located on opposite sides of said drive member.

5. A system for animal coat cutting and shearing, comprising:
   a body portion having at least one mounting pin, a mounting post, and a guide channel, wherein said mounting post interchangeably accepts an insert from one of a clipping comb and a shearing lower blade;
   a clipping blade having a lateral projection dimensioned and configured to slide within said guide channel; and
   a shearing upper blade having a motion linkage with an end dimensioned and configured to connect to said plural mounting pins.

6. The system according to claim 5, wherein said shearing upper blade further comprises a substantially planar member having a plurality of teeth or tines along a forward edge thereof and a drive interface dimensioned and configured to accept a drive member.

7. The system according to claim 6, wherein said motion linkage is pivotably connectable between said shearing upper blade and said mounting pin.

8. The system according to claim 6, wherein said motion linkage is an arm or link pivotably connected to said shearing upper blade and said mounting pin.

9. The system according to claim 8, wherein said at least one mounting pin includes a pair of mounting pills and said motion linkage comprises a pair of links, wherein a respective one of said pair of links pivotably connects to a respective one of said pair of mounting pins.

10. The system according to claim 6, wherein said motion linkage comprises a flexible link connectable between said shearing upper blade and said mounting pin.

11. The system according to claim 6, wherein said motion linkage comprises one or more flexible arms or links extending from said shearing upper blade to said mounting pin.

* * * * *

UNITED STATES PATENT AND TRADEMARK OFFICE
CERTIFICATE OF CORRECTION

| | | |
|---|---|---|
| PATENT NO. | : 7,762,000 B2 | Page 1 of 1 |
| APPLICATION NO. | : 11/913252 | |
| DATED | : July 27, 2010 | |
| INVENTOR(S) | : John Alun Harris Williams | |

It is certified that error appears in the above-identified patent and that said Letters Patent is hereby corrected as shown below:

In column 6, claim 9, line 35, delete "pills" and insert --pins-- therefore.

Signed and Sealed this

Nineteenth Day of April, 2011

David J. Kappos
*Director of the United States Patent and Trademark Office*